United States Patent [19]

Salmi et al.

[11] Patent Number: 5,403,216
[45] Date of Patent: Apr. 4, 1995

[54] SHIP PROPULSION ARRANGEMENT

[75] Inventors: Pekka Salmi, Vantaa; Erkki Ranki; Kari Laukia, both of Helsinki; Ulf Rosovist, Porvoo, all of Finland

[73] Assignee: Kvaerner MASA-Yards OY, Helsinki, Finland

[21] Appl. No.: 126,526

[22] Filed: Sep. 24, 1993

[30] Foreign Application Priority Data

Sep. 28, 1992 [FI] Finland .................. 924334

[51] Int. Cl.⁶ .............................................. B60L 11/02
[52] U.S. Cl. .......................................... 440/6; 440/53
[58] Field of Search ........................ 440/6, 81–83, 440/53, 40, 42, 54, 66, 67, 71, 78, 76, 111, 88, 89

[56] References Cited

U.S. PATENT DOCUMENTS

| 2,691,356 | 10/1954 | Waterval | 115/37 |
| 2,714,866 | 8/1955 | Pleuger et al. | 115/35 |
| 3,814,961 | 6/1974 | Nelson et al. | 400/6 |
| 4,580,517 | 4/1986 | Lundberg | 400/53 |
| 4,694,645 | 9/1987 | Flyborg et al. | 60/221 |
| 5,218,917 | 6/1993 | Harjula et al. | 114/40 |

FOREIGN PATENT DOCUMENTS

| 83614 | 11/1985 | Finland . | |
| 75128 | 2/1986 | Finland . | |
| 76977 | 8/1988 | Finland . | |
| 894407 | 3/1991 | Finland . | |
| 1571890 | 6/1969 | France . | |
| 2238040 | 3/1975 | France | 440/6 |
| 3930514 | 3/1991 | Germany | 440/111 |
| 303856 | 8/1929 | United Kingdom | 440/6 |

OTHER PUBLICATIONS

Azipod brochure, published by Kvaerner Masa Yards Inc. and ABB Strömberg Drives Oy date unknown.
The motor ship, 73 (1992) Jul., No. 7, pp. 64–65 Sutton, Surrey, GB.

*Primary Examiner*—Edwin L. Swinehart
*Attorney, Agent, or Firm*—Smith-Hill and Bedell

[57] ABSTRACT

A main propulsion arrangement for a high power ship or the like comprises an underwater drive unit connected to and turnable by a substantially vertical tubular shaft journalled in the ship. The drive unit and the tubular shaft define a hollow casing enclosing an electrical propulsion motor connected to a propeller shaft, which is connected to a driving propeller external of the casing. The casing is, at its inside, supported by several mainly vertical web plates, which are arranged to act, in combination, as elements structurally stiffening and supporting the casing, as elements securing the propulsion motor in place relative to the casing, as elements transmitting to the casing reaction forces to the torque developed by the propulsion motor, and as wall elements of ducts for incoming and outgoing gaseous coolant for the propulsion motor.

20 Claims, 6 Drawing Sheets

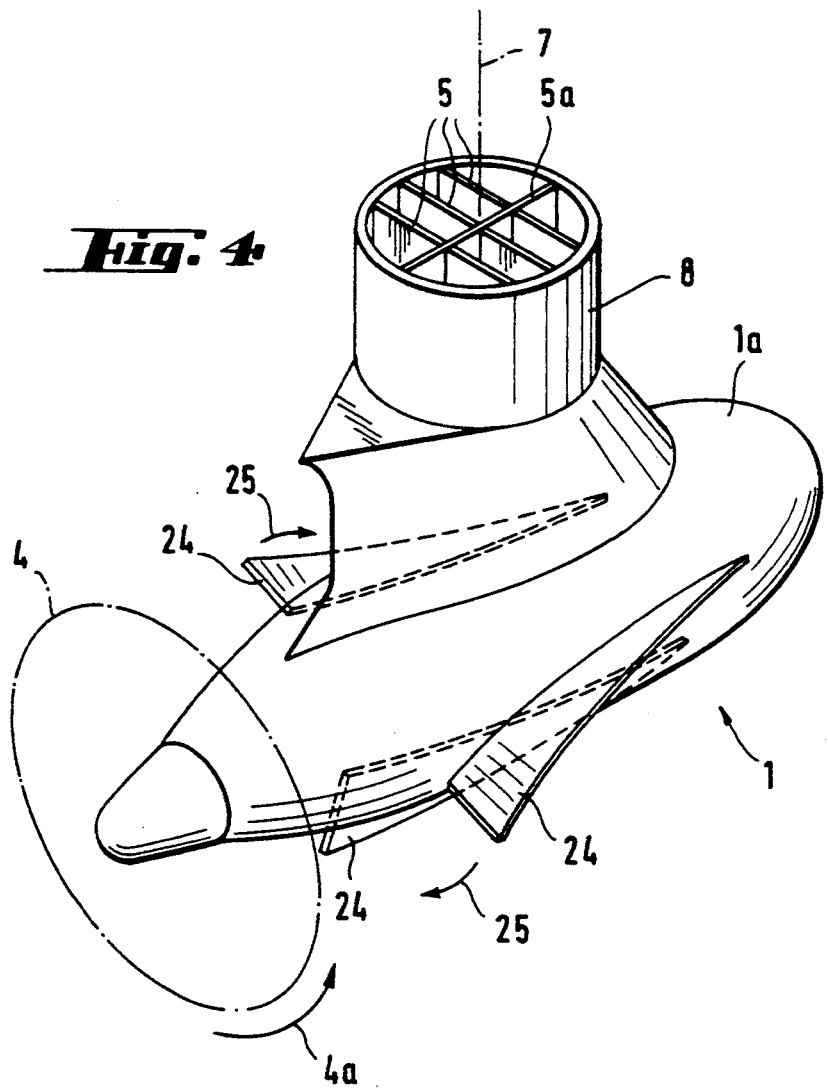
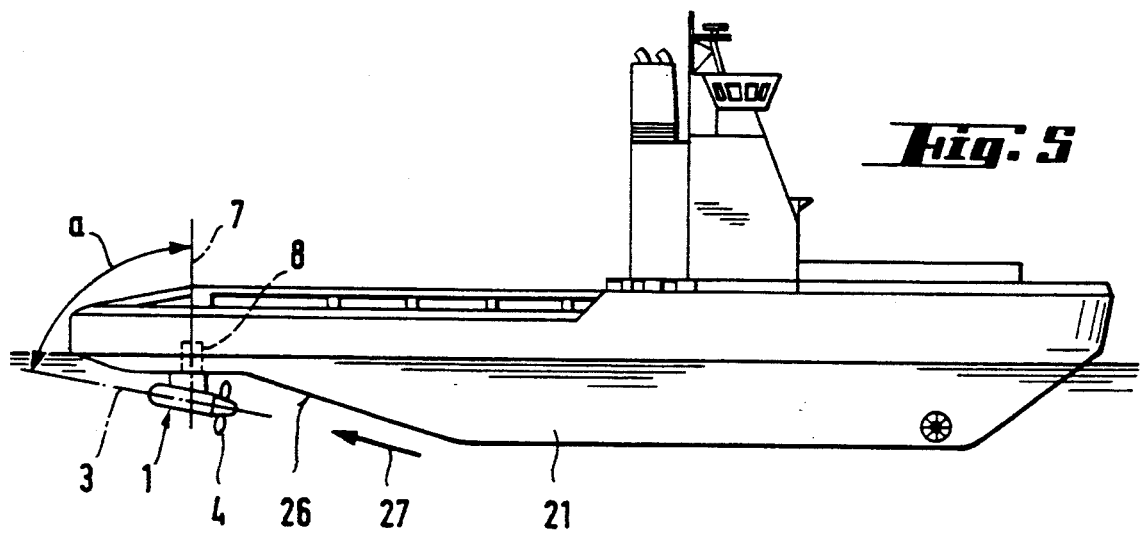

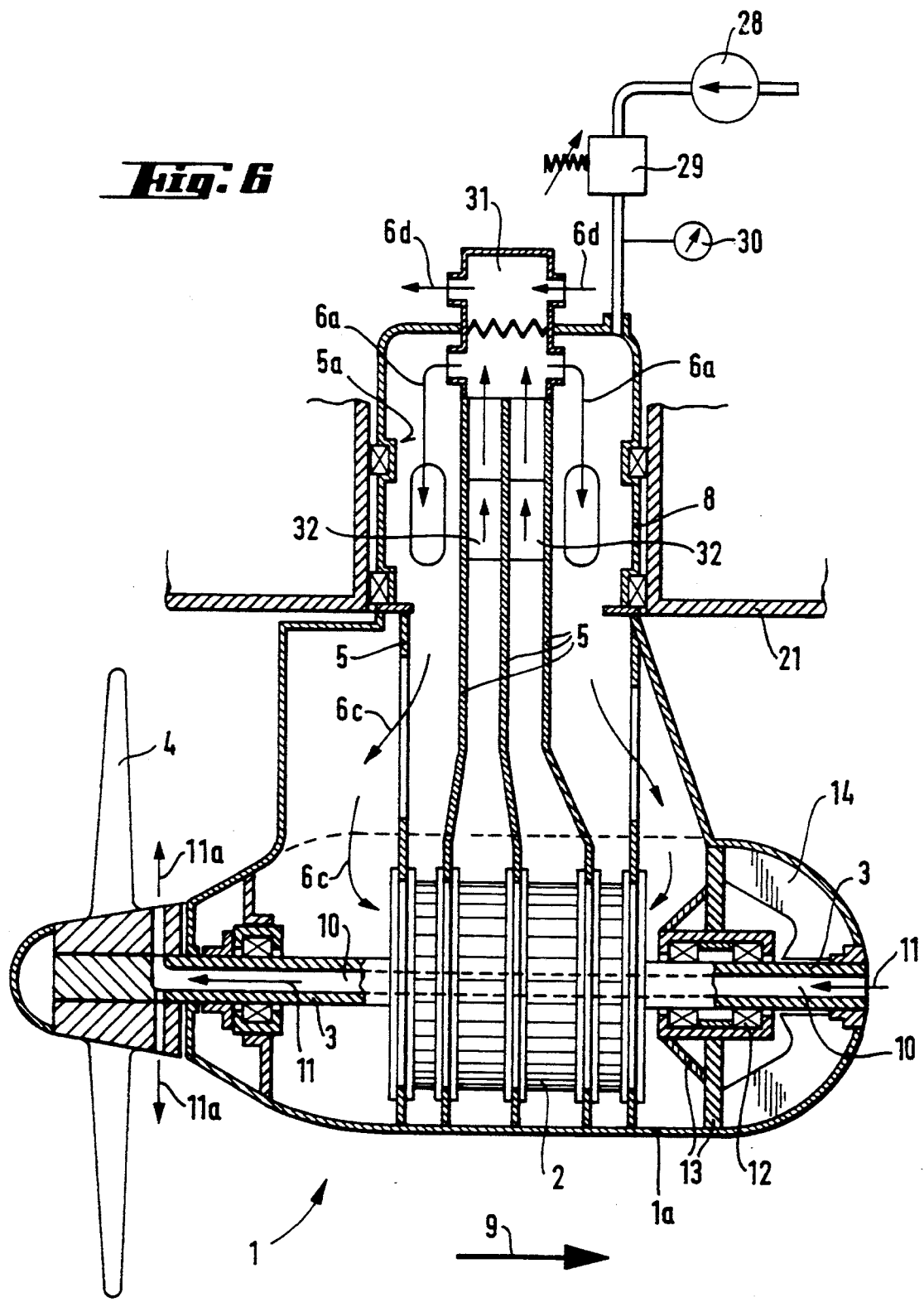

SHIP PROPULSION ARRANGEMENT

BACKGROUND OF THE INVENTION

The invention relates to the main propulsion arrangement of a marine vessel.

The examined patent application publication FI 76977 proposes a ship, of which the main propulsion arrangement consists of a turnable drive unit, inside which there is an electrical motor that is connected to a propeller at the end of the drive unit and acts as the ship's main propulsion motor. In that publication the propulsion arrangement in question is presented only schematically and its realization in a manner acceptable from the view point of economic feasibility and structural strength is not presented at all. The object of the invention is to improve and develop the propulsion arrangement proposed in the publication FI 76977, so that a high power main propulsion arrangement of a ship is created, that functions well in practice and is economically and technically favorable.

SUMMARY OF THE INVENTION

In accordance with a first aspect of the present invention there is provided a main propulsion arrangement for a high power ship or the like, comprising a substantially vertical tubular shaft journalled in the ship, an underwater drive unit connected to the tubular shaft and turnable by means of the tubular shaft, the drive unit and the tubular shaft defining a hollow casing, an electrical propulsion motor in the hollow casing, a propeller shaft connected to the propulsion motor, and a driving propeller external of the casing and connected to the propeller shaft, and wherein the casing is, at its interior, supported by a plurality of substantially vertical web plates, which structurally stiffen and support the casing, secure the propulsion motor in place relative to the casing, transmit to the casing reaction forces to the torque developed by the propulsion motor, and define passages for incoming and outgoing gaseous coolant for the propulsion motor.

In accordance with a second aspect of the present invention there is provided a marine vessel comprising a hull and a main propulsion arrangement attached to the hull at a region thereof, said main propulsion arrangement comprising a substantially vertical tubular shaft journalled in the hull, an underwater drive unit connected to the tubular shaft and turnable relative to the hull by means of the tubular shaft, the drive unit and the tubular shaft defining a hollow casing, a propulsion motor in the hollow casing, a propeller shaft connected to the propulsion motor, and a driving propeller external of the casing and connected to the propeller shaft, and wherein the casing is, at its interior, supported by a plurality of substantially vertical web plates, which secure the propulsion motor in place relative to the casing.

The invention is particularly well suited for a ship of which the propulsion power is 10 megawatt or more, because as the power output of the drive unit increases, the ratio between the maximum diameter of the drive unit and the diameter of the propeller becomes more advantageous. When the propulsion power is about 1.5 MW, the ratio in question is typically about 0.65. When the power is about 10 MW the ratio is likely to be in the range 0.4–0.5. When applying the invention, the aim is to reach such low or even lower numbers.

Because it is not necessary to accommodate a conventional long propeller shaft and corresponding equipment in the hull of the ship when applying the invention, space is released in the hull for other use. Furthermore, the drive machinery of the ship can be located anywhere within the hull, because the transfer of energy from the drive machinery to the propulsion motor takes place via electrical cables. Moreover, the ship does not need a rudder, so that a rudder and its associated structures are not required and no vibrations are transmitted from the rudder to the hull. At the same time the maneuverability of the ship is greatly improved.

When applying the invention the structural strength and the cooling requirements of the drive unit form central problems. The internal support of the casing of the drive unit by means of mainly vertical web plates gives the advantage that the same web plates can also function as attachment elements for the propulsion motor and as elements transmitting to the casing the reaction forces to the torque developed by the propulsion motor. At the same time the web plates function as wall elements of ducts for incoming and outgoing gaseous coolant for the propulsion motor. Thus, the combined multiple use of web plates reduces the size and weight of the propulsion arrangement.

The stress acting on the web plates is greater at the upper half of the propulsion motor than at its lower half. It is therefore advantageous that the propulsion motor have an eccentric position in the drive unit, so that there is more space in the radial direction of the motor for the web plates holding the motor at the top half of the motor than at its bottom half. This also allows a more continuous and smooth transition between the drive unit and its vertical tubular shaft, which is of advantage, in particular for the structural strength of the web plates.

Both space and weight are saved when the web plates holding the propulsion motor are connected directly to the stator of the motor and are designed to form an integrated part of the framework of the stator. Thus, the stator of the propulsion motor forms part of the supporting structure of the drive unit.

A favorable structure is obtained by supporting the propulsion motor by means of five mainly vertical web plates oriented transverse to the central axis of the propulsion motor. The web plates form two supply ducts at opposite respective ends of the motor and two return ducts between the supply ducts. The width of the ducts for incoming coolant measured in the axial direction of the motor may be 20 percent or less of the axial length of the motor. For technical reasons the ducts for incoming coolant are preferably narrower in the axial direction of the motor than the ducts for outgoing coolant. This is obtained by arranging the web plates forming the ducts for incoming coolant at the ends of the motor closer to each other than the web plates forming the ducts for outgoing coolant at the central section of the motor. A portion of the coolant can also be led to the motor axially from outside the web plates at each end of the motor, to create a coolant stream flowing through the air gap between the rotor and stator of the motor and out through radial openings in the stator into the ducts for outgoing coolant.

For hydrodynamic reasons it is of advantage that the propulsion motor be at a considerable distance from the propeller, because the greatest diameter of the drive unit is normally at the position of the motor. The mass of the drive unit should also be divided relatively uniformly relative to the vertical turning axis of the drive unit. The best solution is usually that the center of gravity of the propulsion motor is within that half of the vertically projected cross section of the drive unit's tubular shaft which is farther away from the propeller.

For hydrodynamic and electrotechnical reasons the propulsion motor, which preferably is an alternating current motor, is built so that the ratio of its length to its outside diameter is 0.5–1.8, preferably 1.0–1.6. Thereby the best design with respect to dimensions and power is obtained.

A drive unit according to the invention is usually placed at the rear end of a ship at a location where the bottom of the ship is at a considerably higher level than the bottom of the ship at a location forward of the drive unit. The drive unit will then be protected and its propeller will not reach deeper than the deepest point of the ship. In this case the bottom surface of the ship, in front of the drive unit, rises from the lowest bottom level to the level at which the drive unit is attached. An obliquely upwards sloping bottom surface is formed immediately in front of the drive unit. When the ship moves forwards, the water flows along the oblique bottom surface mainly parallel to that surface, that is, obliquely upwards, and meets the propeller in a direction obliquely from below. This is the case, in particular, when the drive unit has a pulling propeller, so that the propeller is at the front end of the drive unit. In order for the propeller to function as efficiently as possible, the propeller shaft should be mainly parallel with the water currents in question. This is achieved by mounting the drive unit at an angle to its vertical turning axis, so that the angle between the propeller shaft and turning axis is 89°–70° preferably 85°–75°. This also reduces the length of the turning shaft structure of the drive unit, which is of advantage for its structural strength. The drive unit may alternatively be given an oblique orientation if the angle between the drive unit and its turning axis is 90° and the turning axis is obliquely arranged relative to vertical. However, this solution is inferior to the first disclosed solution.

When the propeller acts as a pushing propeller for normal propulsion of the ship, its propulsion power can be increased by placing longitudinal, somewhat obliquely mounted guide vanes outside the drive unit, which vanes impart to the water flowing past the drive unit a rotating movement opposite to the rotation direction of the propeller. These guide vanes then function in principle in the same way as the guide vanes of a turbine, to increase the propeller's power. In addition, the guide vanes provide reinforcement of the drive unit casing and thus increase the strength of the casing. In icy waters the vanes tend to keep large ice chunks away from the drive unit so that they do not easily run into the unit casing, which could cause excessive local stress. The use of guide vanes is also of advantage when the propeller works as a pulling propeller for the normal propulsion of the ship, but their enhancing effect is smaller than for a pushing propeller. "Normal propulsion of the ship" means the propulsion situation for which the ship has been designed for normal operation. Specific maneuvering operations, for example in a harbor, differ from normal propulsion.

Irrespective of whether the propeller works as a pulling or a pushing propeller, the propeller shaft must have a thrust bearing taking up axial load. In a preferred embodiment this thrust bearing is at the opposite end of the drive unit from the propeller. Then the cooling effect of the surrounding water can effectively be utilized to cool the lubricating oil of the bearing. The rotational movement taking place in the bearing can, as known, be utilized to circulate the lubricating oil so that the oil flows through suitably arranged cooling regions. The thrust bearing and its oil-circulating arrangement can favorably be in a closed space at the end of the drive unit.

The space inside the drive unit casing can be pressurized at a level higher than that of the ambient water, so that water cannot leak into the drive unit. This requires that the space in question be closed and that the air pressure be maintained and monitored, for example by means of a compressor and a control device. The air cooling of the propulsion motor is achieved by means of one or several heat exchangers. Such heat exchangers can be used also in other embodiments of the invention.

Cooling of the bearings of the propeller shaft and partly the cooling of the rotor of the propulsion motor can be arranged via the propeller shaft by making a longitudinal cooling duct in the propeller shaft, through which sea water can flow when the ship is moving. The cooling power will then be at its greatest when the ship moves at full power, when the greatest cooling power is needed.

BRIEF DESCRIPTION OF THE DRAWINGS

In the following, the invention will be described more in detail, with reference to the attached drawings in which FIG. 1 schematically shows a perspective view partly in section of a propulsion arrangement according to the invention, FIG. 2 schematically shows a longitudinal section of another propulsion arrangement according to the invention, FIG. 3 schematically shows a cross section of a preferred embodiment of a propulsion arrangement according to the invention, FIG. 4 schematically shows a perspective view of a propulsion arrangement according to the invention, FIG. 5 schematically shows a side view of a ship equipped with a propulsion arrangement according to the invention, FIG. 6 schematically shows a pressurized propulsion arrangement of the general type shown in FIG. 2, and FIG. 7 schematically shows a longitudinal section of a twin-engined propulsion arrangement according to the invention.

DETAILED DESCRIPTION

Figure 1:
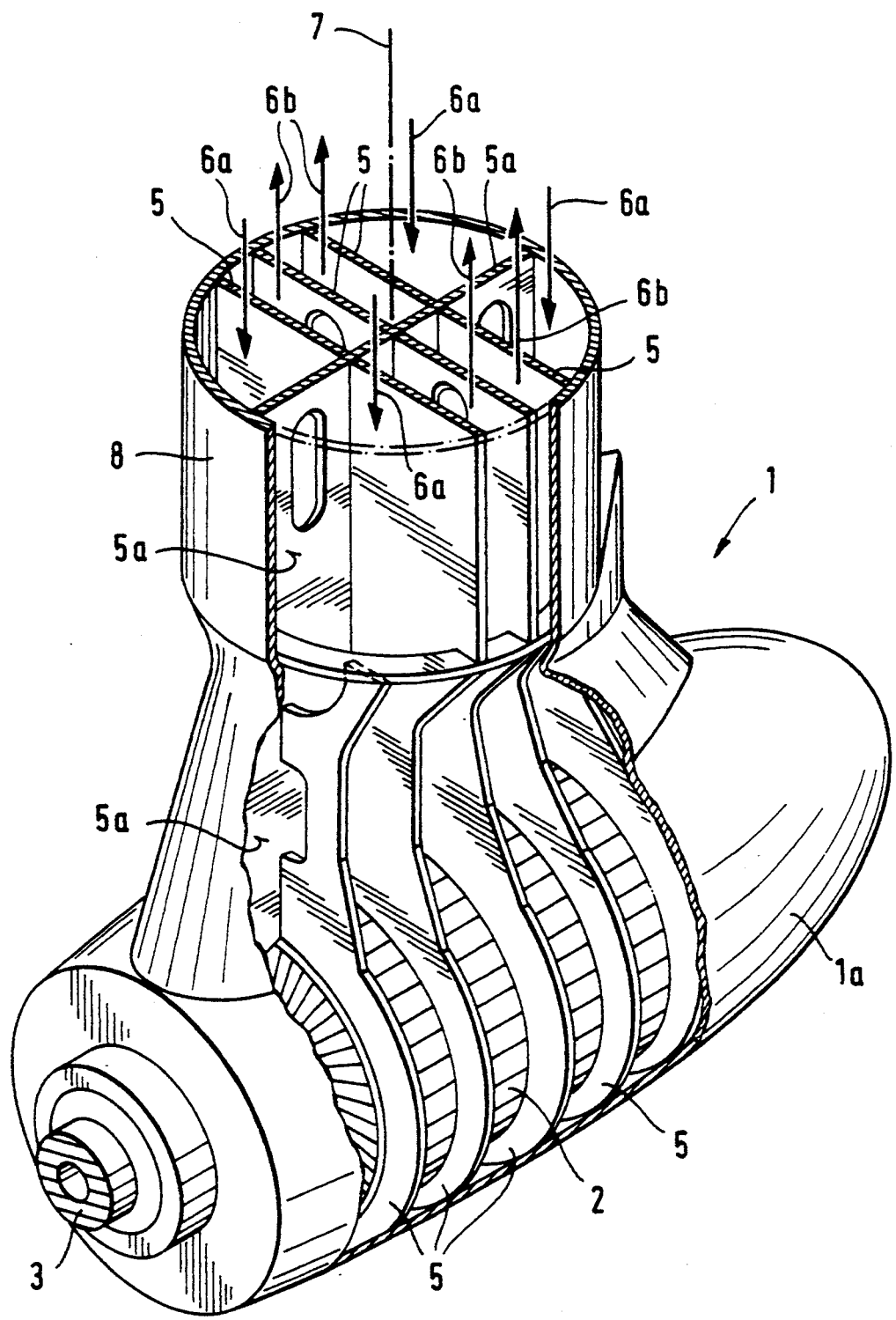

In the drawings, 1a indicates an outer casing including a drive unit 1 and a tubular shaft 8. There is an electrical A.C. propulsion motor 2 inside the drive unit 1 and this motor is directly connected to and drives a propeller shaft 3. A propeller 4 is attached to the propeller shaft external of the casing 1a. In FIG. 1, the propeller is not shown and in FIG. 4 the propeller is shown only schematically. The propeller may be a pulling propeller or a pushing propeller. A pulling propeller is a propeller that is forward of the shaft that delivers torque to the propeller and transmits thrust from the propeller to the hull of the ship, whereas a pushing propeller is a propeller that is aft of the shaft that delivers torque to the propeller and transmits thrust from the propeller to the hull of the ship. The embodiments of FIGS. 1 and 5 use a pulling propeller, the embodiments of FIGS. 2, 4 and 6 a pushing propeller.

The drive unit comprises several web plates 5. These web plates are attached directly to the stator of the propulsion motor 2 and are moreover attached to the casing. In this manner the web plates are integrated into the supporting structure of the stator and transmit to the casing 1a the reaction forces to the torque developed by the propulsion motor. At the same time the web plates 5 function as stiffeners for the casing 1a. Further, the web plates form ducts for incoming and outgoing cooling air needed for cooling the propulsion motor 2. Arrows 6a and 6b indicate the flow direction of the cooling air. The casing 1a and the propulsion motor 2 are also supported by at least one longitudinal web plate 5a.

Figure 2:
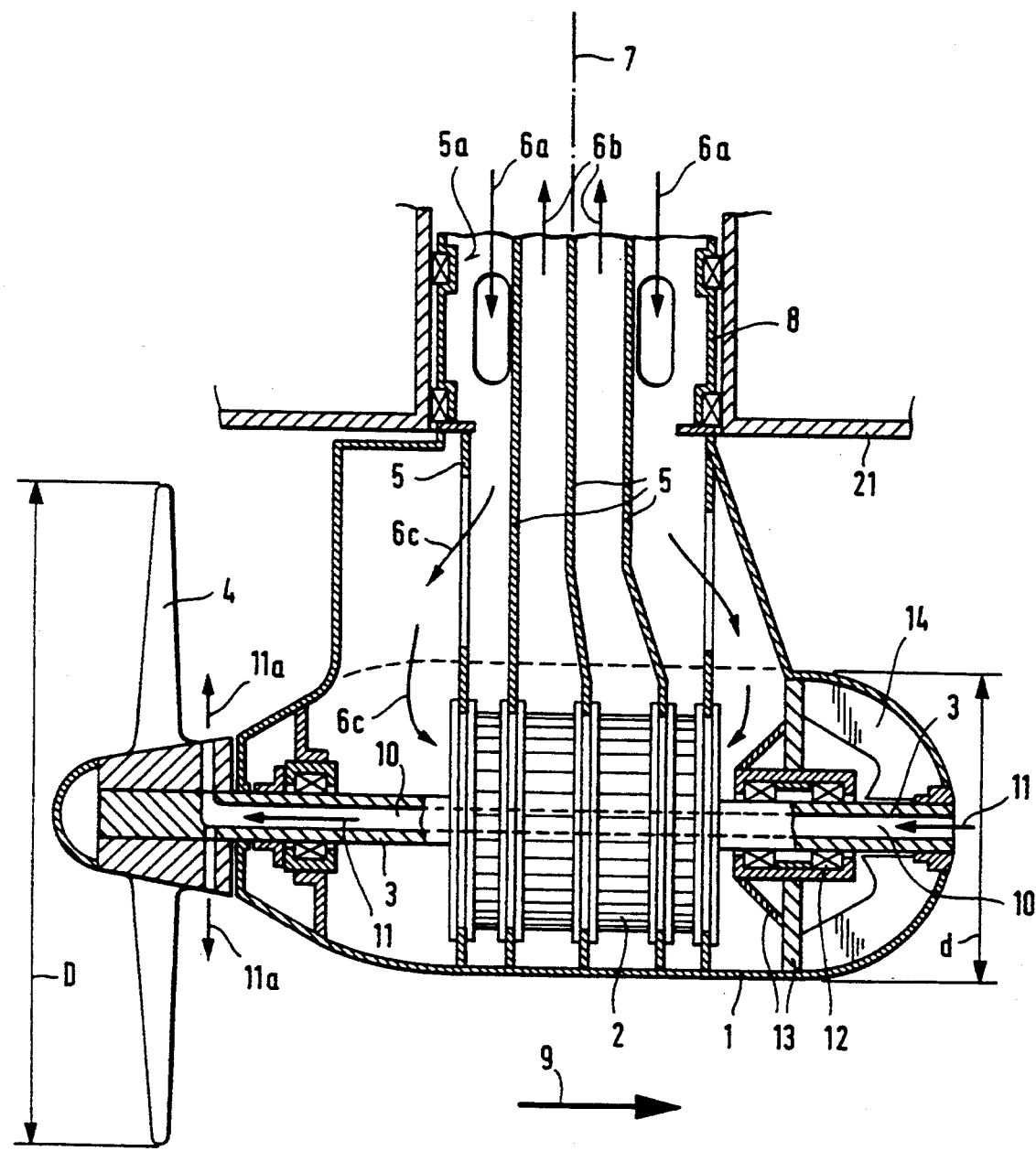

In FIG. 2, the positions of the transverse web plates 5 relative to the motor 2 can be seen clearly. The ducts for the incoming cooling air are at the ends of the motor 2 and the ducts for the outgoing cooling air are located in the central area of the motor, between the ducts for incoming cooling air. The arrows 6c indicate how part of the cooling air fed to the motor is led to the end portion of the motor, where it penetrates into the air gap between the stator and the rotor and flows through that gap and out through radial slots in the stator into the ducts for outgoing cooling air. As has already been explained, in the vicinity of the motor 2, the width of the ducts for the incoming cooling air is noticeably smaller in the axial direction of the motor 2 than the corresponding width of the ducts for the outgoing cooling air.

It can also be seen from FIG. 2 that the center of the motor 2 does not lie on the vertical turning axis 7 of the drive unit 1 and the tubular shaft 8. The center of gravity of the motor, or its central point, is located within that half of the vertically projected cross section of the tubular shaft 8 which is farther from the propeller 4. Thus, the center of gravity of the motor and the propeller are on opposite sides of the plane that is perpendicular to the central axis of the propeller shaft 3 and contains the vertical turning axis of the drive unit 1. This arrangement provides a favorable mass distribution relative to the turning axis 7 and it is also favorable for a good streamlined shaping of the drive unit 1. In FIG. 2 the ratio of the diameter d of the drive unit 1 to the diameter D of the propeller 4 is less than 0.5, which is relatively favorable.

In the embodiment shown in FIG. 2, the cooling effect of the surrounding water is utilized to cool the bearings of the propeller shaft. When the ship moves in the direction of the arrow 9, the surrounding water is pushed into an axial cooling duct 10 formed in the propeller shaft 3 as shown by arrows 11. The water currents in the duct 10 are strongest when the ship moves at full power, when also the need for cooling is the greatest. The flow of water can be increased by arranging radial ducts at the propeller end, in which ducts the flow shown by arrows 11a is enhanced by centrifugal force. If the propeller 4 is a pulling propeller, rather than a pushing propeller as shown in FIG. 2, the simplest solution is that the cooling duct 10 is arranged in a linear manner axially through the entire propeller shaft and the propeller hub.

In FIG. 2, the propeller shaft is supported by three bearings, one of which is a thrust bearing 12 that takes up the axial thrust of the propeller shaft 3. The thrust bearing 12 is the bearing that requires the greatest degree of cooling. This bearing may be separated by means of walls 13 from the rest of the internal space of the drive unit 1. A closed space 14 is thereby formed at one end of the drive unit, which space is strongly under the influence of the cooling effect of the surrounding water. The lubricating oil of the bearing 12 may, by known means, be circulated in the space 14, so that it is subject to a strong cooling effect from the surrounding water.

Figure 3:
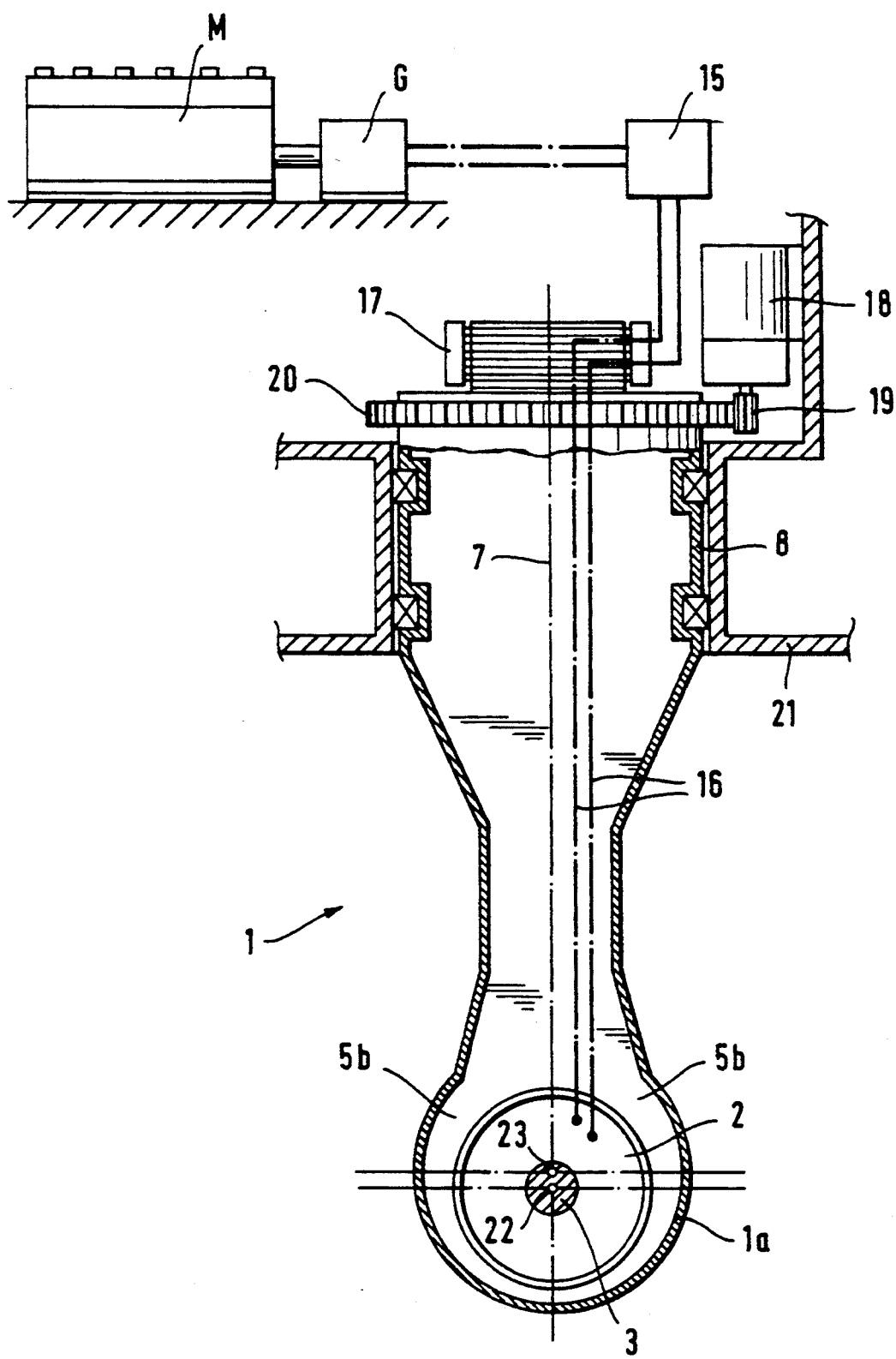

FIG. 3 schematically shows the main engine M of the ship driving an electrical generator G. This combination is connected to a central control device 15, which transmits the power produced by the generator through cables 16 to the propulsion motor 2. The cables 16 are shown only schematically. Because the propulsion motor 2 is in the turnable unit 1, the power has to be led to the propulsion motor via a slipring device 17. The turning of the drive unit 1 is carried out by means of a steering motor 18, which acts via a pinion 19 on a gear ring 20 attached to the tubular shaft 8. Structures that are part of the ship's hull are indicated by numeral 21.

FIG. 3 shows that the propulsion motor 2 is eccentrically mounted in the drive unit 1. The center 22 of the motor 2 is lower than the center 23 of the drive unit. Because of this, the radial extent of the web plates 5 is greater in the portion 5b at the upper side of the motor, which improves their structural strength. The eccentricity referred to can be about 3–5 percent of the outer diameter of the motor 2.

FIG. 4 shows longitudinal, slightly obliquely mounted guide vanes 24 outside the drive unit 1. These vanes impart to the water flowing past the drive unit 1 a rotational movement in the direction of the arrows 25, that is, in a direction opposite to the rotation direction 4a of the propeller 4. This enhances the propulsive power of the propeller. At the same time the vanes 24 act as outer stiffeners for the casing 1a.

FIG. 5 shows how a drive unit 1 can be mounted on a ship. The drive unit may be mounted obliquely so that the angle a between its turning axis 7 and the propeller shaft 3 is about 80°. This is a favorable solution, especially when the propeller is a pulling one, in which case the propeller is close to an upwardly rising rear bottom portion 26 of the ship, where the water flows mainly in the direction of the arrow 27. The oblique position of the drive unit 1 has the effect that when the drive unit is in its normal propulsion position, so that the propeller shaft is in a vertical plane parallel to or coincident with the longitudinal central plane of the ship, the propeller works mainly in the direction of the water flowing past it, which is favorable from the point of view of maximizing propulsion efficiency. The shown oblique position of the drive unit 1 reduces the length of the tubular shaft 8, which gives noticeable advantages with regard to its structural strength.

In FIG. 6, the entire internal space of the drive unit 1 and its tubular shaft 8 is closed and maintained under pressure. The pressure is kept above that of the highest pressure of the surrounding water, so that water cannot leak into the drive unit and cause damage to the equipment in the pressurized space. The pressure is maintained by means of a compressor device 28 and is controlled by means of an automatic control device 29. Required gauge and/or supervision equipment 30 are connected to the system. In order to ensure that the cooling of the propulsion motor 2 functions properly, a coolant, such as water or air, is pumped through a heat exchanger 31 as indicated by arrows 6d in heat-exchange relationship with the air inside the closed internal space.

For the circulation of cooling air inside the closed space one or more fans 32 are required. Cooling of the propulsion motor by means of one or several heat exchangers may also be used in a case where the internal space of the drive unit is not kept under pressure or is not closed for other reasons.

Figure 7:
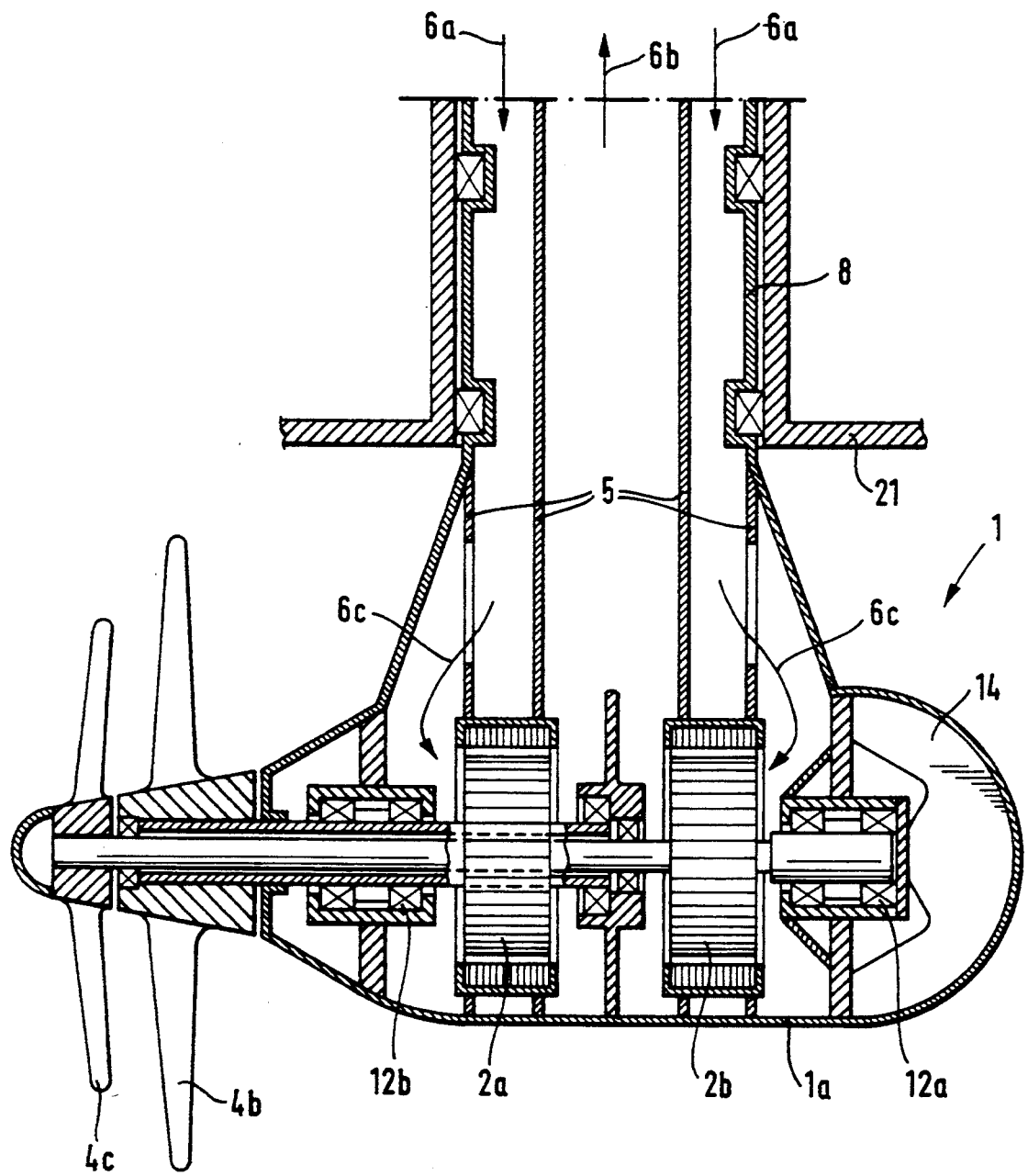

In FIG. 7, there are two independently working propulsion motors 2a and 2b in the drive unit 1. The propulsion motor 2a is directly connected to a propeller 4b and the propulsion motor 2b is directly connected to a propeller 4c. In the embodiment shown the propellers 4b and 4c are at the same end of the drive unit, but it is also feasible that the propellers would be at opposite ends of the drive unit. The propellers 4b and 4c rotate in opposite directions. Each propeller has its own thrust bearing 12a and 12b, respectively. The air cooling of the propulsion motors 2a and 2b is arranged mainly in the same manner as in FIGS. 1 and 2, but there are only four transverse web plates 5. The use of two or more propellers rotating in pairs in opposite directions improves propulsion efficiency, as is known from patent publication FI 75128. In the publication FI 75128, the propellers are shown to receive their driving power from a single motor through a gearing. The use of two separate electrical motors is, however, in particular at high propulsion powers, a considerably more favorable solution both in terms of economy and technology.

The invention is not restricted to the embodiments shown, but several modifications thereof are feasible within the scope of the attached claims.

It is claimed:

1. A main propulsion arrangement for a high power movable floating structure, comprising a substantially vertical tubular shaft journalled in the floating structure, an underwater drive unit connected to the tubular shaft and turnable by means of the tubular shaft, the drive unit and the tubular shaft defining a hollow casing, an electrical propulsion motor in the hollow casing, a propeller shaft connected to the propulsion motor, and a driving propeller external of the casing and connected to the propeller shaft, and wherein the casing is, at its interior, supported by a plurality of substantially vertical web plates, which structurally stiffen and support the casing, secure the propulsion motor in place relative to the casing, transmit to the casing reaction forces to the torque developed by the propulsion motor, and define ducts for incoming and outgoing gaseous coolant for the propulsion motor.

2. A propulsion arrangement according to claim 1, wherein the propulsion motor is eccentrically disposed in the drive unit so that the radial extent of space between the motor and the casing is greater above the motor than below the motor.

3. A propulsion arrangement according to claim 1 wherein the electrical propulsion motor has a stator and the web plates holding the propulsion motor are connected directly to the stator of the motor and form a part of the structural framework of the stator.

4. A propulsion arrangement according to claim 1, wherein the propeller shaft has a rotational axis, the tubular shaft has a turning axis, a first plane contains both said rotational axis and said turning axis, a second plane is perpendicular to the first plane and contains said turning axis, the propeller is positioned on one side of the second plane, and the propulsion motor is positioned with its center of gravity on the opposite side of the second plane from the propeller.

5. A propulsion arrangement according to claim 1, wherein the ratio of the length of the propulsion motor to its external diameter is 0.5–1.8.

6. A propulsion arrangement according to claim 5, wherein the ratio of the length of the propulsion motor to its external diameter is 1.0–1.6.

7. A propulsion arrangement according to claim 1, wherein the angle between the propeller shaft and the turning axis of the tubular shaft is 89°–70° and the orientation of the propeller shaft in its normal propulsion position essentially corresponds to the flow direction of water flowing past the drive unit at the location of the propeller.

8. A propulsion arrangement according to claim 7, wherein the angle between the propeller shaft and the turning axis of the tubular shaft is 85°–75°.

9. A propulsion arrangement according to claim 1, wherein there are longitudinal, obliquely positioned guide vanes disposed outside the hollow casing to stiffen the casing and to deflect water flowing past the drive unit in a direction such as to increase the propulsion power of the propeller.

10. A propulsion arrangement according to claim 1, comprising an oil-lubricated thrust bearing taking up axial load from the propeller shaft, said thrust bearing being located at the opposite end of the drive unit from the propeller, and wherein the cooling effect of ambient water is arranged to cool the lubricating oil of the bearing.

11. A propulsion arrangement according to claim 1, wherein the space inside the casing is pressurized to a level above the pressure of the water surrounding the casing and air cooling of the propulsion motor is effected by means of a heat exchanger.

12. A propulsion arrangement according to claim 11, comprising means for establishing a recirculating flow of cooling air around the propulsion motor and through the heat exchanger.

13. A propulsion arrangement according to claim 1, comprising means for establishing a flow of cooling air through the ducts defined by the web plates, and a heat exchanger means for extracting heat from the air flowing towards the propulsion motor.

14. A propulsion arrangement according to claim 1, wherein the propeller shaft is formed with an axial cooling duct through which surrounding water may flow for removing heat energy from the propeller shaft.

15. A propulsion arrangement according to claim 1, comprising at least two independently functioning propulsion motors in the drive unit, each of which motors is connected to drive its own propulsion propeller.

16. A marine vessel comprising a hull and a main propulsion arrangement attached to the hull at a region thereof, said main propulsion arrangement comprising:
   a substantially vertical tubular shaft journalled in the hull,
   an underwater drive unit connected to the tubular shaft and turnable relative to the hull by means of the tubular shaft, the drive unit and the tubular shaft defining a hollow casing,
   a propulsion motor in the hollow casing,
   a propeller shaft connected to the propulsion motor, and
   a driving propeller external of the casing and connected to the propeller shaft,
   and wherein the casing is, at its interior, supported by a plurality of substantially vertical web plates, which secure the propulsion motor in place relative to the casing and define ducts for incoming and outgoing gaseous coolant for the propulsion motor, and the marine vessel further comprises:

means for establishing a flow of cooling air through the ducts defined by the web plates, and a heat exchanger means for extracting heat from the air flowing towards the propulsion motor.

17. A marine vessel according to claim 16, wherein the angle between the propeller shaft and the turning axis of the tubular shaft is 89°–70° and the orientation of the propeller shaft in its normal propulsion position essentially corresponds to the flow direction of water flowing past the drive unit at the location of the propeller.

18. A marine vessel according to claim 16, comprising means for pressurizing the space inside the casing to a level above the pressure of the water surrounding the casing.

19. A marine vessel according to claim 16, wherein the propulsion motor is an electrical A.C. propulsion motor and the vessel further comprises a main engine mounted in the hull, an electrical generator coupled drivingly to the main engine for converting mechanical power output of the main engine to A.C. electrical power, and cable means extending through the tubular shaft for connecting the electrical generator to the propulsion motor.

20. A main propulsion arrangement for a high power movable floating structure, comprising a substantially vertical tubular shaft journalled in the floating structure, an underwater drive unit connected to the tubular shaft and turnable by means of the tubular shaft, the drive unit and the tubular shaft defining a hollow casing, an electrical propulsion motor in the hollow casing, a propeller shaft connected to the propulsion motor, and a driving propeller external of the casing and connected to the propeller shaft, and wherein the casing is, at its interior, supported by five substantially vertical web plates, which are arranged substantially perpendicular to the propeller shaft, structurally stiffen and support the casing, secure the propulsion motor in place relative to the casing, transmit to the casing reaction forces to the torque developed by the propulsion motor, and define ducts for incoming and outgoing gaseous coolant for the propulsion motor.

* * * * *